June 14, 1932.  L. M. DIETERICH  1,863,191
UNIDIRECTIONAL MECHANISM
Filed July 11, 1928
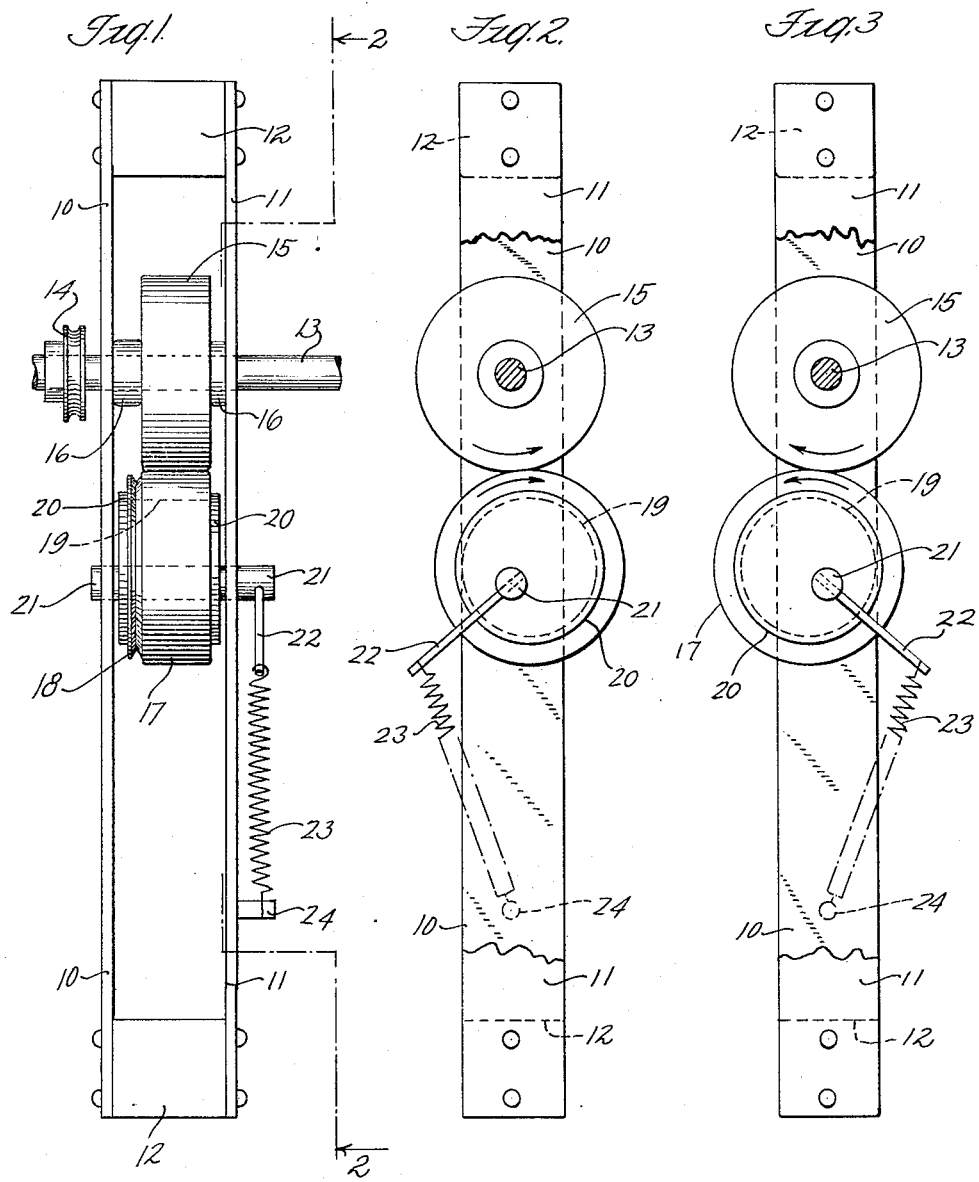
Ludwig M. Dieterich
INVENTOR
BY Robert S. Blair
ATTORNEY Patented June 14, 1932

1,863,191

UNITED STATES PATENT OFFICE

LUDWIG M. DIETERICH, OF NEWARK, NEW JERSEY, ASSIGNOR OF ONE-THIRD TO ROBERT S. BLAIR, OF STAMFORD, CONNECTICUT

UNIDIRECTIONAL MECHANISM

Application filed July 11, 1928. Serial No. 291,993.

This invention relates to unidirectional mechanism.

One of the objects thereof is to provide practical mechanism of the above type of simple and durable construction. Another object is to provide a mechanism of the above type the action of which is dependable and efficient. Another object is to provide mechanism of the above type adapted for long-continued hard use without deterioration in action or injury to its parts. Another object is to provide mechanism of the above type which shall be readily susceptible to changes to meet varying conditions of use. Other objects will be in part obvious or in part pointed out hereinafter.

The invention accordingly consists in the features of construction, combinations of elements, and arrangements of parts which will be exemplified in the structure hereinafter described and the scope of the application of which will be indicated in the following claims.

In the accompanying drawing in which is shown one of various possible embodiments of this invention, Figure 1 is an edge view of the same;

Fig. 2 is a side elevation taken in the direction indicated by the arrows in Fig. 1, certain parts being broken away in order to show the construction more clearly; and Fig. 3 is a view similar to Fig. 2, showing the parts in another position.

Similar reference characters refer to similar parts throughout the several figures of the drawing.

Referring now to the drawing in detail, there is indicated in somewhat diagrammatic form a frame comprising side plates 10 and 11 secured to spacing-box 12 at their ends. Journaled within these plates is a shaft 13 which may be driven as by a pulley 14 and which is provided with a roller 15 secured thereto and concentrically mounted thereon. Suitable spacing collars 16 are provided at each side.

Coacting with this roller and adapted to be driven thereby is a sleeve 17 provided with a pulley 18 from which power may be taken if desired. Sleeve 17 has a bearing of any desired type for free rotary movement upon a circular hub 19 flanged on each side as at 20 in order to hold the sleeve in position thereon. This hub 19 is fast upon a shaft 21 journaled in plates 10 and 11. The shaft, however, is eccentric to the hub 19, as indicated in the drawing, and is provided with a crank arm 22, the other end of which is secured to a tension spring 23 stretched between it and a fixed pin 24 upon the plate 11.

The eccentricity of the hub 19 with respect to the shaft 21 is such that the maximum radius of the hub with the sleeve thereon is unable to swing past the plane in which the centerlines of shafts 13 and 21 lie. The parts are so proportioned, however, that upon any tendency of the hub to swing in this direction additional to the effect of the spring 23, the parts will jam and lock themselves against such motion. Thus, when the parts are in the position indicated in Fig. 2 of the drawing, if the roller 15 rotates as indicated by the arrows it will frictionally drive the sleeve 17 as indicated by the arrow thereon in this figure. The thrust of this driving action is in a direction opposite to the wedging direction with the parts thus positioned. If, however, there is a tendency to reverse the direction of rotation of the part 15 and move in a direction opposite to that of the arrows of Fig. 2, then the thrust acts with the spring 23 to swing the major radius of hub 19 toward the plane of the shafts 13 and 21. This, with the parts formed as above, having due regard to the coefficient of friction of the material employed, will jam them together and prevent rotation.

If it is desired to reverse the locking direction of rotation, the arm 22 is merely swung clockwise from the position indicated in Fig. 2 into the position indicated in Fig. 3 in which the major axis of the hub 19 lies to the left of the plane of the shafts. Thereupon by an action the converse of that above described, free rotation is permitted in the direction indicated by the arrows in Fig. 3 and any tendency to rotation in the opposite direction is prevented.

Considering first the action of the sleeve 17 and parts associated therewith other than the roller 15, it is to be noted that this portion of the mechanism is susceptible of use with a wide variety of coacting parts and for various purposes without loss of certain of the dominant advantages of the invention. Over whatever member the sleeve 17 rolls, its motion in one direction is entirely free, and yet upon a tendency to reverse direction, the parts are jammed together with any desired force, the pressure being greater, other things being equal, as the eccentricity of the part 19 is less. Furthermore, by a quick shift of the arm 22, the direction of permissible rotation is reversed.

Considering the coaction of this mechanism with the roller 15, it will be seen that there is provided a power transmission of the unidirectional type of instantaneous action and a high degree of efficiency. It is furthermore to be noted that in all cases there is a constant change of the point on which the jamming pressure is exerted both as regards the sleeve 17 and the roller 15. In this manner wear of the parts is rendered uniform and the chance of formation of a depression is reduced to a minimum.

It will thus be seen that there is provided apparatus in which the several objects of this invention are achieved and that the same is well suited to meet the hardest conditions of practical use.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In a unidirectional mechanism, in combination, a rotary member having a substantially circular outer surface, a member with the surface of which said first member has a rolling engagement about an axis substantially central thereof, and means mounting said first member to move about an eccentric axis and adapted to cause it to jam into locking engagement upon a tendency to reverse rotation, said eccentric axis passing within the circumference of said first member.

2. In a unidirectional mechanism, in combination, a rotary member having a substantially circular outer surface, a member with the surface of which said first member has a rolling engagement about an axis substantially central thereof, means acting interiorly of the surface of said first member adapted to cause it to jam into locking engagement upon a reversal of direction of rotation, and means adapted to reverse said locking means and cause it to act in the opposite direction.

3. In a unidirectional mechanism, in combination, a rotary member having a substantially circular outer surface, a member with which it has rolling engagement about an axis substantially central thereof, an eccentrically mounted member upon which said first member is journaled, and a spring tending to swing said eccentric member and force said first member into engagement with the member with which it has rolling engagement.

4. In a unidirectional mechanism, in combination, a sleeve, a member upon which said sleeve is journaled and provided with an eccentric shaft passing therethrough, a member with which said sleeve has rolling engagement, and resilient means tending to swing said shaft in a predetermined direction.

5. In a unidirectional mechanism, in combination, a sleeve, a member upon which said sleeve is journaled and provided with an eccentric shaft passing therethrough, a member with which said sleeve has rolling engagement, and resilient means tending to swing said shaft in a predetermined direction, said resilient means being formed to permit reversal of the direction in which it tends to swing said shaft.

6. In a unidirectional mechanism, in combination, a pair of rotary members in rolling engagement with each other, means mounting one of said members to tend to swing it into jamming relation with the other member upon a reversal of their direction of rotation, means adapted to drive one of said members, and means adapted to take power from the other of said members whereby power may be transmitted therethrough.

7. In a unidirectional mechanism, in combination, a pair of rotary members in rolling engagement with each other, and means mounting one of said members to tend to swing it into jamming relation with the other member upon a reversal of their direction of rotation, each of said members being provided with a bearing to which it is concentric.

8. In a unidirectional mechanism, in combination, a pair of rotary members in rolling engagement with each other, an eccentrically mounted device upon which one of said members has a bearing concentric with its outer surface, and resilient means tending to swing said eccentric device in a direction to force said members together.

9. In a unidirectional mechanism, in combination, a pair of rotary members each provided with bearings concentric to its outer surface, means adapted to drive one of said members, means adapted to take power from the other of said members, an eccentric member upon which one of said rotary members is journaled, and means adapted to swing said eccentric member in a direction to force said rotary members together.

10. In a unidirectional mechanism, in combination, a pair of rotary members each provided with bearings concentric to its outer surface, means adapted to drive one of said members, means adapted to take power from the other of said members, an eccentric member upon which one of said rotary members is journaled, and means adapted to swing said eccentric member in a direction to force said rotary members together, the parts being so proportioned as to cause said eccentric member to jam said rotary members into locking relation upon a tendency to rotation in a predetermined direction.

11. In a unidirectional mechanism, in combination, a member having a round outer surface, an eccentric shaft mounting said member, a sleeve journaled upon said outer surface and having its outer surface concentric therewith, a member coacting with said sleeve, the eccentricity of said mounting being such as to prevent its major radius from swinging in one direction, and resilient means adapted to be set to tend to swing said eccentric mounting in either direction at will.

12. In a unidirectional mechanism, in combination, a pair of rotary members having substantially circular outer surfaces in rolling engagement with each other, means mounting one of said members for rotation in rolling contact with the other of said members so that one rotary member may be driven from the other rotary member, and eccentric means mounting the other of said rotary members adapted to swing it into jamming relation with its mating rotary member upon a reversal of their direction of rotation.

13. In a unidirectional mechanism, in combination, a rotary member having a substantially circular outer surface and mounted about an axis substantially central thereof, a second rotary member having a substantially circular outer surface in rolling engagement with said first member, and means mounting said second member about an eccentric axis and adapted to cause it to jam into locking engagement when the direction of rotation of either member is reversed.

In testimony whereof, I have signed my name to this specification this 9th day of July, 1928.

LUDWIG M. DIETERICH.